H. SUNDHAUSSEN.
BALL BEARING.
APPLICATION FILED SEPT. 3, 1920.
1,384,002.
Patented July 5, 1921.
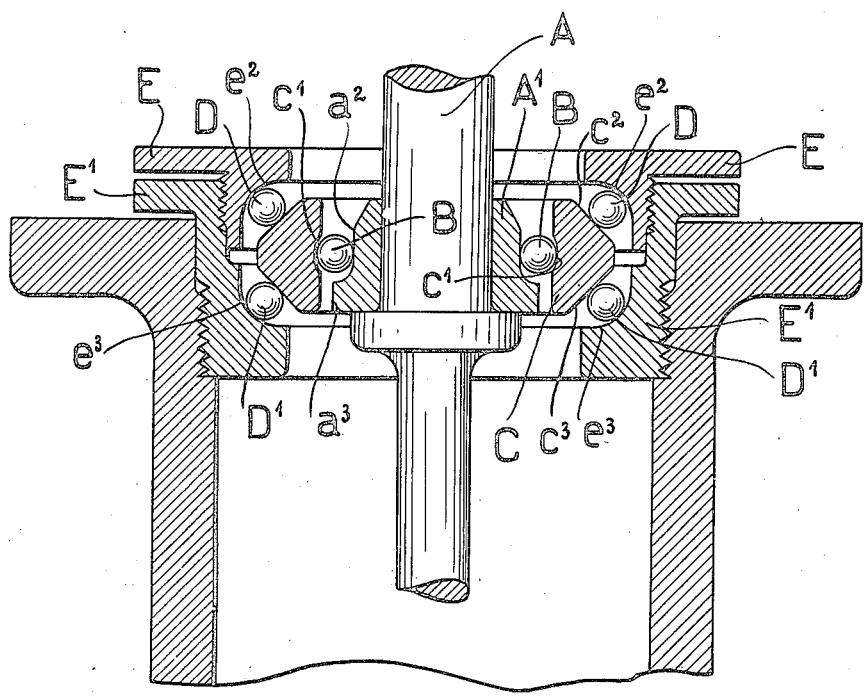

UNITED STATES PATENT OFFICE.

HERMANN SUNDHAUSSEN, OF ESSEN, GERMANY, ASSIGNOR TO FRIED. KRUPP AKTIENGESELLSCHAFT, OF ESSEN-ON-THE-RUHR, GERMANY.

BALL-BEARING.

1,384,002.          Specification of Letters Patent.          Patented July 5, 1921.

Application filed September 3, 1920. Serial No. 408,087.

*To all whom it may concern:*

Be it known that I, HERMANN SUNDHAUSSEN, residing at 23, Bredeneyerstr., Essen, Germany, a citizen of the German Republic, have invented a certain new and useful Improvement in Ball-Bearings, for which I have filed an application in Germany on November 4, 1915, of which the following is a specification.

This invention refers to a ball bearing especially intended for rapidly rotating shafts which in addition to a simple and reliable construction also permits of both an axial movement and also an oblique setting of the shaft within certain limits.

The invention will be described with reference to the accompanying drawing, which shows a longitudinal section through the ball bearing together with the adjacent parts concerned.

A denotes a vertical shaft which rotates rapidly when running and is rigidly connected to the inner bearing ring $A^1$ of the ball bearing. A portion of the peripheral surface of the bearing ring $A^1$ is formed with a cylindrical surface $a^2$ coaxial with the axis of rotation of the shaft A and so forming the inner bearing surface for a row of balls B. The corresponding bearing surface for the balls B is formed by a circular groove $c^1$ which is cut in the cylindrical inner surface of an outer bearing ring C and the diameter of which circular groove $c^1$ exceeds the diameter of the balls B in size.

The bearing ring $A^1$ has on its lower end a collar $a^3$ which fits over a hollow neck on the cylindrical surface $a^2$ and together with the groove $c^1$ prevents the balls from falling down. The bearing ring C, the peripheral surface of which has two conical surfaces $c^2$ and $c^3$ of corresponding pitch, and the bases of which are turned toward each other, rests by means of these conical surfaces on two rows of balls D and $D^1$ which in their turn are each supported against hollow neck $e^2$ and $e^3$ provided on the inner wall of the two part outer bearing ring E and $E^1$. The radius of the hollow necks $e^2$ and $e^3$ is greater than the diameter of the balls D and $D^1$ and are of such dimensions that the balls D and $D^1$ can adjust themselves upwardly or downwardly within certain limits.

The above described ball bearing possesses the property that, when the shaft A rotates, the balls B can roll within certain limits in the direction of the longitudinal axis of the shaft A on the cylindrical surface $a^2$ and furthermore an automatic adjustment of the balls D and $D^1$ is possible upwardly or downwardly along the hollow necks $e^2$ and $e^3$. The result is, in addition to a simple and reliable construction of the ball bearing, the important advantage that an axial movement or an oblique position of the shaft A cannot bring about any jamming in the ball bearing.

Without in any way altering the essential features of the invention, the bearing ring C may also be mounted to rotate on the other bearing ring E $E^1$ by means of a single ring of balls, provided the support of this ring of balls is of such a nature that it permits of the shaft being set obliquely.

Claims.

1. In a ball bearing, the combination with an inner member having an external bearing surface and an outer member having an internal bearing surface, of an intermediate ring having internal and external bearing surfaces coacting with the first mentioned bearing surfaces respectively, and balls interposed between each pair of coacting bearing surfaces, one of said bearing surfaces being cylindrical to permit relative axial movement of the inner and outer members, and another of said bearing surfaces being longitudinally curved to permit relative angular movement of said members.

2. A ball bearing according to claim 1 in which the intermediate ring has a pair of oppositely presented external bearing surfaces inclined to the axis of the bearing and the outer member has a pair of longitudinally curved bearing surfaces coacting respectively with the external bearing surfaces on the intermediate ring, a series of balls being interposed between each pair of coacting bearing surfaces.

The foregoing specification signed at Essen, Germany.

HERMANN SUNDHAUSSEN.

In presence of—
  CLEMENS PASOL,
  CARL MÜLLER.